July 7, 1959 — D. M. BARRETT — 2,894,144
DIAPHRAGM APPARATUS FOR X-RAY TUBES
Filed Oct. 21, 1957 — 2 Sheets-Sheet 1
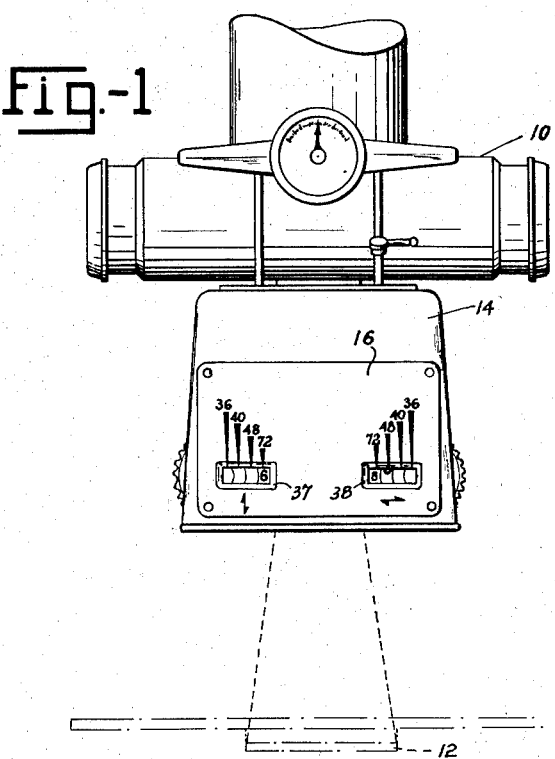
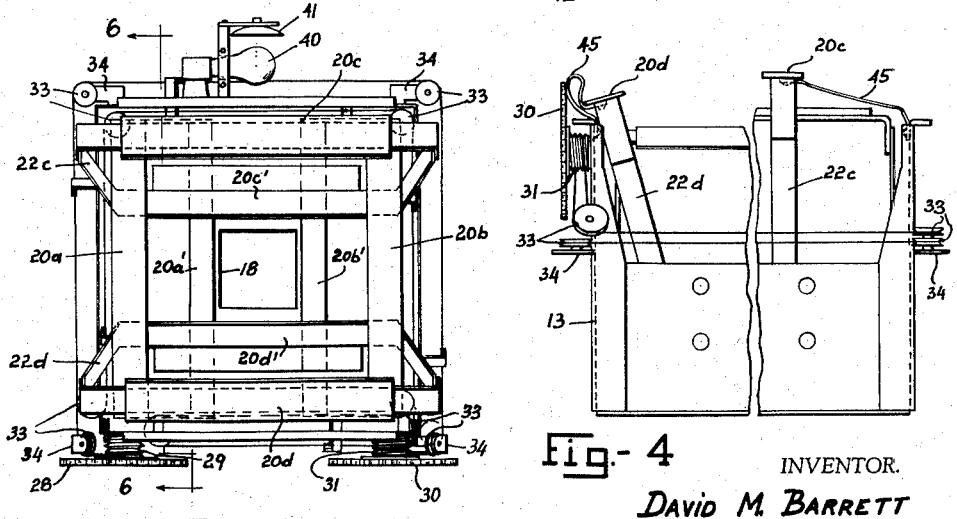
INVENTOR.
DAVID M. BARRETT
BY
Bates, Teare & McBean
ATTORNEYS July 7, 1959
D. M. BARRETT
2,894,144
DIAPHRAGM APPARATUS FOR X-RAY TUBES
Filed Oct. 21, 1957
2 Sheets-Sheet 2
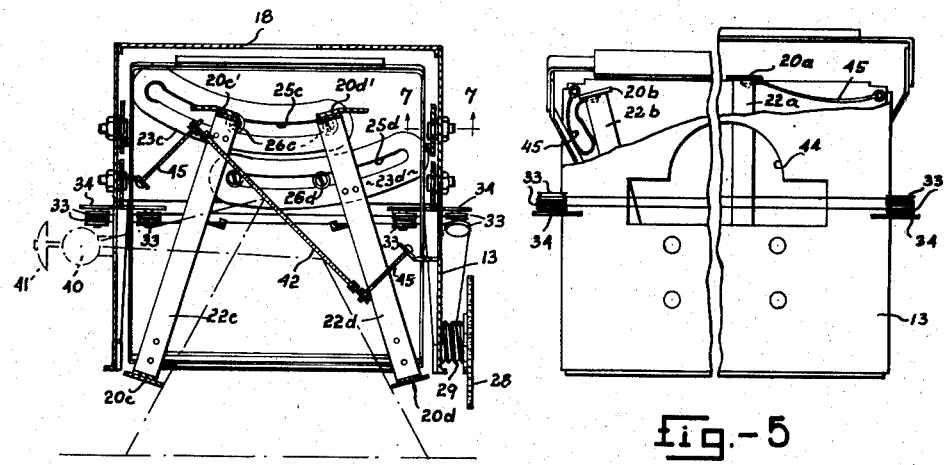
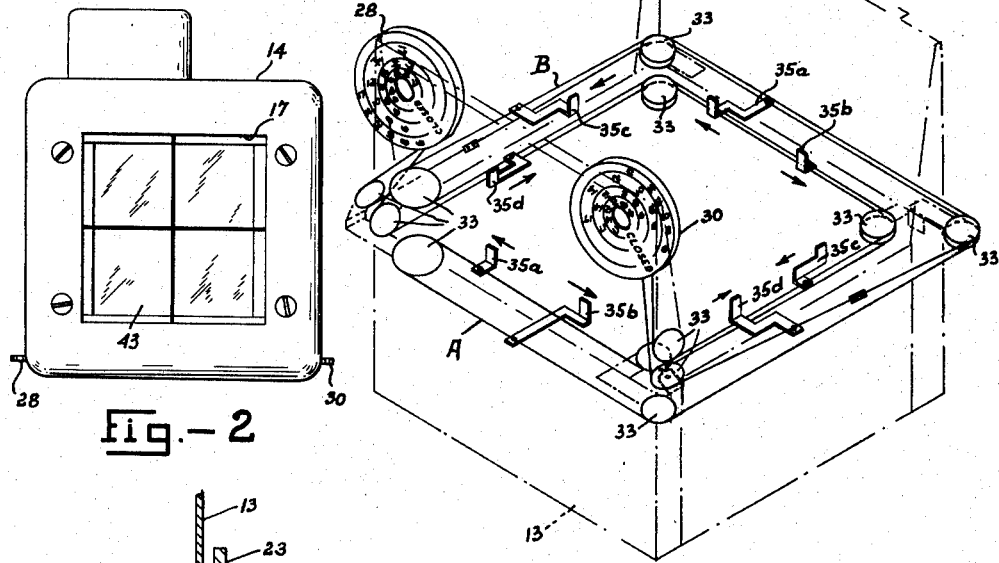
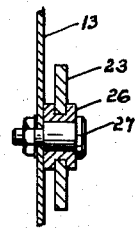
INVENTOR.
DAVID M. BARRETT
BY
Bates, Teare & McBean
ATTORNEYS

United States Patent Office 2,894,144
Patented July 7, 1959

2,894,144

DIAPHRAGM APPARATUS FOR X-RAY TUBES

David M. Barrett, Lyndhurst, Ohio, assignor to Picker X-Ray Corporation, Waite Mfg. Div., Inc., Cleveland, Ohio, a corporation of Ohio Application October 21, 1957, Serial No. 691,220

5 Claims. (Cl. 250—105)

This invention relates generally to improvements in X-ray apparatus and more particularly is directed towards providing an improved diaphragm apparatus for limiting the field of radiation from a source of X-rays.

The use of X-ray impermeable diaphragm apparatus to limit the field of radiation emanating from a source of X-rays is well known and various types of such apparatus have been developed for mounting on X-ray tubes. One or more diaphragms may be employed and it is customary to provide some externally accessible means for adjusting the diaphragms to control the field of radiation at various target distances. In radiography, the field of radiation is normally adjusted to coincide with the size of the radiographic film plate and, because of varying plate sizes and varying target distances, the diaphragm adjustment is pre-calibrated and provided with an indicator to permit selection of the proper adjustment for a given plate size and target distance.

The different elements of the multiple diaphragms may be independently adjustable or they may be adjustable in various combinations under a common control. The indicator is usually in the form of a table or chart appearing on an outer diaphragm casing from which the operator selects various adjustments which will provide the desired field of radiation. However, such arrangements are not completely satisfactory because they require an operator to first interpret the table or chart to determine the correct adjustment for a particular plate size and target distance and then translate this interpretation into the proper diaphragm adjustment.

Accordingly, it is the principle object of this invention to provide an improved arrangement for adjusting an X-ray diaphragm apparatus which provides a direct reading of the resultant field sizes for any selected target distance.

Briefly, in accordance with this invention, there is provided a diaphragm casing which can be mounted on the protective housing of an X-ray tube and which is provided with openings at opposite ends for passing an X-ray beam towards a target such as a radiographic film. In the preferred form, an adjustable diaphragm is disposed adjacent each opening within the casing and each diaphragm includes opposed pairs of X-ray impervious plates which can be closed or opened to control the field of radiation passing through the diaphragm assembly. Preferably, one pair of plates of each diaphragm is positioned by means of one cable and pulley system which is controlled by a dial wheel mounted on the casing, while the other pair of plates of each diaphragm is positioned by a separate cable and pulley system controlled by another dial wheel mounted on the casing. Each dial wheel is provided with a set of indications, one set of which represents one dimension while the other set represents the other or transverse dimension of the field of radiation. The indications are so located with respect to each other and to other indications adjacent corresponding sight openings on the external face of the casing, where such other indications represent different precalibrated distances of the radiographic film from the source of X-rays, as to provide a direct reading of the resultant field sizes at any selected target distance.

In the drawings:

Fig. 1 shows the diaphragm apparatus mounted on the protective casing of an X-ray tube in operative relation to an X-ray table and a radiographic film which are represented by dotted lines;

Fig. 2 is a bottom view of the diaphragm casing showing a transparent cover plate for projecting a visible indication of the center of the field of radiation towards the target area;

Fig. 3 is a bottom view of the diaphragm assembly with the bottom cover plate removed;

Fig. 4 is a broken side elevation of the diaphragm assembly with the outer casing removed;

Fig. 5 is a broken side elevation of the adjacent side of the diaphragm assembly with the casing removed;

Fig. 6 is a sectional view through the diaphragm assembly taken along the lines 6—6 in Fig. 3 of the drawings;

Fig. 7 is an enlarged, partial sectional view of a subassembly of the diaphragm apparatus taken along the lines 7—7 in Fig. 6 of the drawing; and Fig. 8 is a diagrammatic, perspective view of the mechanisms employed for adjusting the diaphragm assembly.

Referring now more particularly to Fig. 1 of the drawings, an X-ray tube 10 is shown supported in operative position above an X-ray table represented by the dotted line 11 and is intended to pass a beam of X-rays through a subject of examination on the table towards a radiographic film disposed below the table and represented by the dotted lines 12. When employing X-ray apparatus for radiography in this manner it is generally desired to limit the field of radiation at the radiographic film to the precise area of the film. As hereinbefore noted, this is ordinarily accomplished by employing a diaphragm apparatus which utilizes adjustable X-ray impervious diaphragm members to confine the X-ray beam to the desired field of radiation. The diaphragm assembly is usually self-contained in an internal housing 13 which is enclosed by a casing such as 14 shown mounted on the protective casing of the X-ray tube 10. This invention is directed primarily to providing an improved arrangement for adjusting the diaphragm assembly within the casing 14 in a manner that will provide a direct reading of the resultant field sizes at pre-calibrated distances shown on a cover plate 16.

In the preferred form shown, the diaphragm casing 14 is provided with an opening in each end for passing the beam of X-rays from the source towards the target film. As best shown in Figs. 2 and 3, the bottom opening 17 is larger in area than the upper opening 18 which is located adjacent the source of X-rays. The diaphragm assembly includes two adjustable diaphragms, one of which is located adjacent the upper opening 18 and the other which is located adjacent the lower opening 17. Each adjustable diaphragm consists of two transversely disposed pairs of X-ray impervious plates 20, with the plates of each pair being movable towards and away from each other to open and close the corresponding diaphragm opening in a manner to be hereinafter more fully described. Thus, the plates 20a, 20b form one pair of the lower or larger diaphragm while the plates 20c, 20d form the other pair of the lower diaphragm. Correspondingly numbered plates form the pairs of the upper or smaller diaphragm and are designated with a prime to distinguish them from the plates of the lower diaphragm.

As best shown in Figs. 3 to 6 of the drawings, the corresponding diaphragm plates, e.g. 20a, 20a, of each diaphragm are rigidly interconnected by a frame 22 for movement as a unit. For ease of description the same reference numeral will be applied to like parts, although the letters a, b, c and d are employed as subscripts in the drawings to identify the respective parts with the corresponding portion of the diaphragm assembly as hereinbefore noted. Each interconnecting frame 22 carries a pair of arcuate guide brackets 23 (Fig. 6) which are riveted to the corresponding frame members intermediate the upper and lower diaphragms and adjacent the corresponding side wall of the internal housing 13 of the diaphragm assembly. Each guide bracket 23 has an arcuate slot 25 which in each instance, engages a bearing wheel 26. The bearing wheels 26 are rotatably journaled on spindles 27 mounted on the adjacent internal housing wall as best shown in Fig. 7 of the drawing. The bearing wheels are so located on the corresponding internal housing walls that their engagement with the corresponding guide bracket slots 25 position the interconnecting frame members 22 of the upper and lower diaphragms in a manner to provide a smaller diaphragm opening adjacent to the source of X-rays than at the outer end of the diaphragm assembly. This arrangement provides the requisite beam angle for any selected beam of radiation throughout the range of operation. Furthermore, as the rectangular frame members 22 of each pair of diaphragm plates are moved towards and away from each other transverse to the axis of the projected X-ray beam, the arcuate guide members 23 insure a proper beam angle from a wide open position to a closed position.

In its preferred form, the mechanism for adjusting the position of the diaphragm plates 20 is a cable and pulley system which is diagrammatically illustrated in Fig. 8 of the drawing. Since the two pairs of diaphragm plates which make up each diaphragm operate in directions transverse to each other, the cable and pulley system actually consists of two independent systems, one of which positions the diaphragm plates of one pair towards and away from each other in one direction, and the other of which independently positions the diaphragm plates of the other pair towards and away from each other in a transverse direction. Each cable and pulley system is independently controlled by means of a dial wheel; the wheel 28 controlling one paired set of diaphragm plates and the wheel 30 controlling the other paired set. The dial wheels 28 and 30 are rotatably journaled in spaced relation on the external face of one internal housing wall and each has a grooved cable guide 29 and 31 respectively disposed in concentric relation about its axis of rotation. Each cable system also includes a plurality of idler pulley wheels, such as 33, which are journaled for free rotation in suitable brackets, such as 34, which are strategically mounted on the internal housing 13 to guide the corresponding cable in an operative path for diaphragm adjustment. Suitable brackets, such as 35, are carried by each cable system and are secured to the corresponding interconnecting frames of the diaphragm assembly to cause them to move in response to rotation of the corresponding dial wheel. For ease of understanding, the cable system which operates the paired sets of diaphragm plates 20a, a' and 20b, b' is identified with the letter A while the cable system which operates the paired sets of diaphragm plates 20c, c' and 20d, d' is identified with the letter B. It will be readily apparent by reference to Fig. 8 that rotation of the dial wheels in the proper direction will open and close the corresponding paired sets of the diaphragm assembly and thereby vary the field of radiation.

Returning now to Fig. 1 of the drawings, it is seen that the external casing 14 of the diaphragm assembly is provided with a cover plate 16 which has sight openings 37 and 38 respectively exposing a radially extending portion of each dial wheel. Target distances are indicated by numerical markings spaced along each sight opening and each dial wheel has similar numerical markings representing the corresponding dimension of the field of radiation which it controls. The markings on each dial wheel and on the cover plate are so located with respect to each other as to provide a direct reading of any resultant field size at any selected target distance. This arrangement eliminates the necessity for interpreting charts and tables or the like and then translating such information into an adjustment of the diaphragm openings. With this arrangement an operator can directly set the dimensional size of the field of radiation desired on the corresponding dial wheels for the selected target distance.

In addition to the foregoing, the diaphragm apparatus of this invention includes a built-in optical system consisting of a lamp 40, a reflector 41, and a right-angle mirror 42 which provides full illumination of the exact projected field area. The internal housing wall adjacent the lamp 40 is provided with a suitably formed opening 44 to pass the light rays to the mirror. In addition suitable light shields 45 of flexible material are provided to mask the area around the diaphragm plates 20. As best shown in Fig. 2 of the drawings, the lower opening 17 of the diaphragm casing is closed by the transparent cover plate 43 which has transversely disposed markings which project a cross hair shadow to indicate the center of the field. Although the mirror 42 is fixed for any particular setting, its mounting within the internal housing 13 is accomplished by means of adjusting screws 45 which can be turned to adjust the angle of tilt of the mirror. Thus, any misalignment between the illuminated and X-ray field can be corrected by tilting the mirror and checking its alignment against check radiographs, or in any other well known manner.

There has been provided in accordance with this invention an improved diaphragm apparatus employing a direct cable drive for limiting the field of radiation from a source of X-rays with a direct reading of the resultant field sizes at precalibrated target distances being shown on the outer casing throughout the range of operation. The field of radiation is illuminated with a marking that indicates the center of the field, and means are provided for aligning the illuminated field with the radiation field.

While I have shown and described what I consider to be the preferred embodiments of my invention, it will be obvious to those skilled in the art that other changes and modifications may be made without departing from the scope of my invention as defined by the appended claims.

I claim:

1. An X-ray diaphragm assembly comprising, a casing adapted to be mounted adjacent a source of X-rays and having openings at opposite ends for passing an X-ray beam therethrough toward a radiographic film, an adjustable diaphragm operatively disposed intermediate said openings for limiting the field of radiation, means for adjusting said diaphragm to vary the field of radiation at the film, and visible means coacting with said adjustable means throughout the range of operation to provide a direct indication of resultant field sizes for any selected target distance, said diaphragm adjusting means including a cable and pulley system and a cable controlling wheel, said visible means including field dimensional indications on the wheel and target distance indications on the casing adjacent the wheel.

2. An X-ray diaphragm assembly comprising, a casing adapted to be mounted adjacent the source of X-rays and having openings at opposite ends for passing an X-ray beam therethrough toward a radiographic film, an adjustable diaphragm operatively disposed intermediate said openings for limiting the field of radiation, means for adjusting said diaphragm to vary the field of radiation at the film, and visible means coacting with said adjustable means throughout the range of operation to provide a direct indication of resultant field sizes for any selected target distance, said diaphragm adjusting means being controlled by a wheel rotatably journaled on one wall of the casing, and a cover plate mounted on said one wall and having a sight opening exposing a radially extending portion of said wheel, said wheel having a plurality of indications on the face adjacent to the sight opening representing different precalibrated dimensions for the field of radiation, said cover plate having a plurality of indications on its external face adjacent to the sight opening representing different precalibrated distances between the X-ray source and the radiographic film, said indications on the wheel and on the cover plate being so located in relation to each other as to provide a direct reading of resultant field sizes for any selected target distance.

3. An X-ray diaphragm assembly comprising, a casing adapted to be mounted adjacent a source of X-rays and having openings at opposite ends for passing an X-ray beam therethrough toward a radiographic film, an adjustable diaphragm adjacent each opening for limiting the field of radiation, each diaphragm including two transversely disposed pairs of relatively movable parallel X-ray impervious members, the corresponding X-ray impervious members of each diaphragm being rigidly interconnected for movement as a unit, and being so disposed as to provide a smaller diaphragm opening at the end of the casing adjacent to the source, means for moving the interconnected members of each diaphragm towards and away from each other transverse to the X-ray beam, and means for guiding movement of the interconnected members toward and away from each other to vary the angle of the X-ray beams from a minimum to a maximum, said means for moving the interconnected members of each diaphragm pair towards and away from each other including a separate cable and pulley system independently coacting with interconnecting members of each diaphragm pair, each of said cable and pulley systems being controlled by a wheel rotatably journaled on a wall of the casing whereby rotation of said wheel independently moves the interconnected members of different diaphragm pairs towards and away from each other respectively.

4. An X-ray diaphragm assembly comprising, a casing adapted to be mounted adjacent a source of X-rays and having openings at opposite ends for passing an X-ray beam therethrough toward a radiographic film, an adjustable diaphragm adjacent each opening for limiting the field of radiation, each diaphragm including two transversely disposed pairs of relatively movable parallel X-ray impervious members, the corresponding X-ray impervious members of each diaphragm being rigidly interconnected for movement as a unit and being so disposed as to provide a smaller diaphragm opening at the end of the casing adjacent to the source, means for moving the interconnected members of each diaphragm towards and away from each other transverse to the X-ray beam, and means for guiding movement of the interconnected members toward and away from each other to vary the angle of the X-ray beams from a maximum to a minimum, said means for moving the interconnected member towards and away from each other including a separate cable and pulley system adapted for independent coaction with the interconnecting members of each diaphragm pair, the cables of each system carrying rigid connectors adjacent and secured to the corresponding interconnecting member of each diaphragm pair, a pair of wheels independently journaled for rotation adjacent a common wall of the casing, one of said wheels coacting with one cable to control movement of the interconnected members of one diaphragm pair and the other wheel coacting with the other cable to control movement of the interconnected members of the other diaphragm pair, and a cover plate mounted on the external face of said one casing wall and having sight openings disposed adjacent each wheel and exposing a radially extending portion of the corresponding wheel, each wheel having a plurality of indications on the face adjacent the corresponding sight opening representing different precalibrated dimensions for the field of radiation and said cover plate having a plurality of indications on its external face adjacent each sight opening representing different precalibrated distances between the X-ray source and the radiographic film, the indications on each wheel and adjacent each sight opening being so located as to provide a direct reading of resultant field sizes for any selected target distance.

5. An X-ray diaphragm assembly comprising, a casing adapted to be mounted adjacent a source of X-rays and having openings at opposite ends for passing an X-ray beam therethrough toward a radiographic film, an adjustable diaphragm adjacent each opening for limiting the field of radiation, each diaphragm including two transversely disposed pairs of relatively movable parallel X-ray impervious members, the corresponding X-ray impervious members of each diaphragm being rigidly interconnected for movement as a unit, and being so disposed as to provide a smaller diaphragm opening at the end of the casing adjacent to the source, means for moving the interconnected members of each diaphragm towards and away from each other transverse to the X-ray beam, means for guiding movement of the interconnected members toward and away from each other to vary the angle of the X-ray beam from a maximum to a minimum, said diaphragm moving means including a cable and pulley system and a cable controlling member, a first indicating means carried by said cable controlling member for visibly indicating the size of the field of radiation externally through the casing, and other indicating means located on the casing adjacent said first indicating means and representing various precalibrated target distances, each of said indicating means positioned for coaction throughout the range of operation to provide a direct reading of field size for any selected target distance.

References Cited in the file of this patent

UNITED STATES PATENTS

| | | |
|---|---|---|
| 1,738,945 | Brenkert et al. | Dec. 10, 1929 |
| 1,767,756 | Hall | June 24, 1930 |
| 1,976,179 | Mannl | Oct. 9, 1934 |
| 2,295,975 | Storm | Sept. 15, 1942 |
| 2,501,756 | Berggren | Mar. 28, 1950 |
| 2,542,196 | Haupt | Feb. 20, 1951 |
| 2,570,820 | Knab | Oct. 9, 1951 |
| 2,844,736 | Johns et al. | July 22, 1958 |